Feb. 27, 1934.  J. F. WALLACE  1,949,288
HYDROPNEUMATIC STRUT
Filed June 22, 1931  2 Sheets-Sheet 1

INVENTOR
John F. Wallace

Feb. 27, 1934.   J. F. WALLACE   1,949,288
HYDROPNEUMATIC STRUT
Filed June 22, 1931   2 Sheets-Sheet 2
Fig. 3.
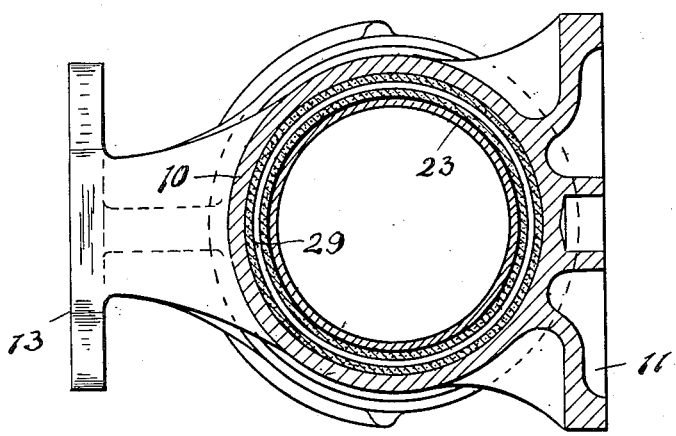
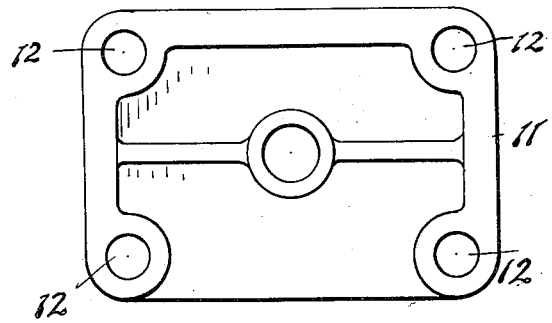
Fig. 4.
INVENTOR
John F. Wallace Patented Feb. 27, 1934

1,949,288

UNITED STATES PATENT OFFICE 1,949,288

HYDROPNEUMATIC STRUT

John F. Wallace, Cleveland, Ohio, assignor to The Cleveland Pneumatic Tool Company, Cleveland, Ohio, a corporation of Ohio Application June 22, 1931. Serial No. 546,021

6 Claims. (Cl. 267—64)

This invention relates to improvements in hydropneumatic struts for use as shock absorbers, being intended primarily for application to automotive vehicles.

One of the objects of the invention is the provision of novel means for metering liquid, such as oil, past the head of the piston for retarding relative movements of the piston and cylinder and checking rebound following the compression of air on the impact stroke, such means having the further function of centering the piston and holding it against any tendency to cock or bear too heavily on one side.

Another object is the provision of a novel packing gland ring provided with an apron acting as a slide bearing for the outer wall of the piston.

Other objects and features of novelty will appear as I proceed with the description of that embodiment of the invention which, for the purposes of the present application, I have illustrated in the accompanying drawings, in which Figure 1 is an elevational view of a shock absorbing strut embodying the invention.

Fig. 3 is a cross sectional view taken substantially on the line 3—3 of Fig. 2, and Fig. 4 is an elevational view of an attachment plate on one side of the cylindrical bracket.

Figure 1:
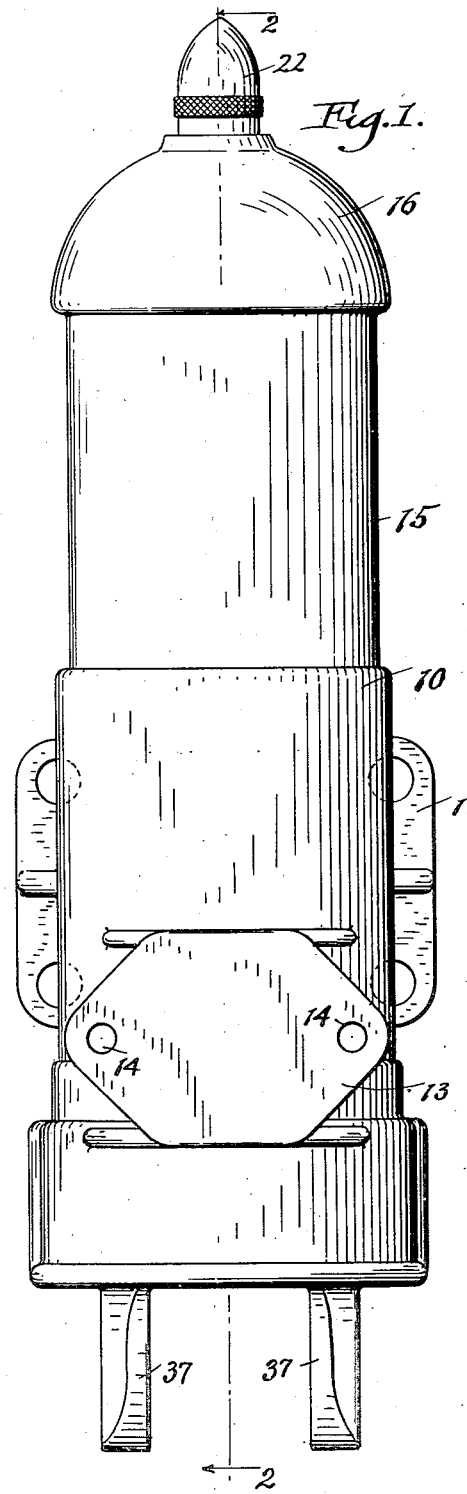

In the drawings I have shown a bracket 10, which is of generally cylindrical form, and is provided on one side with an attachment plate 11 having bolt holes 12 therethrough, by means of which the bracket may be secured to one of the parts whose relative movements are to be cushioned, as for instance to the frame of a vehicle. I may also provide on the opposite side of the bracket 10 a second plate 13 having bolt holes 14 therethrough, by means of which a bumper or other instrument may be attached to the frame if desired.

The bracket 10 is internally threaded near its upper end to receive the threaded lower end of a cylinder 15, constructed preferably of steel tubing. This cylinder may be provided with a dome-shaped upper or outer extremity 16. At the juncture between this dome-shaped extremity and the cylindrical portion of the cylinder I may employ a reenforcing ring 17 which may be secured in position by a weld 18. The dome 16 has a threaded opening therein for the reception of a threaded plug 19, which in turn is internally threaded to receive an air valve 20 carrying a knurled collar 21, by means of which the valve may be threaded out of the plug 19 in order to provide an oil filler opening, or threaded into the plug in order to close such opening. A dust cap 22 threaded onto the exterior of the plug 19 serves as a protection for the valve.

Within the outer cylinder 15 there is an inner cylinder or piston 23, which has an upper closed end 24. This piston member is externally threaded to receive a threaded collar 25, preferably formed of bronze, and finished on its outer surface to have a close sliding fit within the cylinder 15. In its outer wall I cut a spiral groove 26, open at both ends. The groove, if single, or the series of grooves if more than one are used, must extend entirely around the periphery of the collar 25, so that any line drawn on the exterior surface of the collar parallel to the axis thereof will cross a groove 26. Preferably one groove 26 entirely encircles the head.

Figure 2:
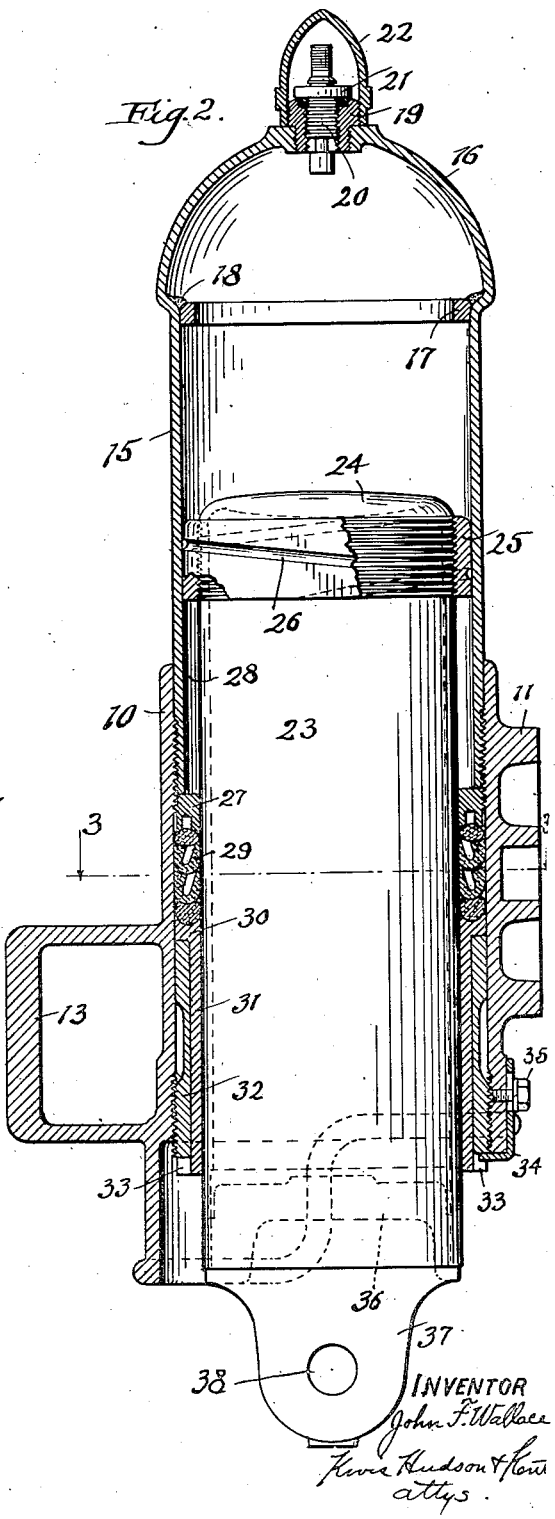
Fig. 2 is a longitudinal sectional view of the same, taken substantially on the line 2—2 of Fig. 1.

After the cylinder 15 is threaded into the bracket 10 to the position indicated in Fig. 2, a backing ring 27 is inserted into the bracket 10 from the lower end thereof and threaded into position against the end of cylinder 15, this ring being finished on its inner surface to have a close sliding fit upon the outer wall of piston or inner cylinder 23. In this manner there is provided an annular space 28 between the adjacent walls of the two cylinders, which space varies in extent as the two cylinders move with respect to each other. Next, a packing 29 is inserted and positioned in engagement with the backing ring 27, after which a gland ring 30 is inserted. In the preferred form of the invention, as herein illustrated, this gland ring is made integral with a cylindrical apron 31 that extends downwardly a considerable distance to form a slide bearing surface of large area for the inner cylinder 23. This apron and ring may be formed of bronze impregnated with graphite, or otherwise treated to have an inner bearing surface with a low friction coefficient; in other words this bearing is what is known in the trade as an oilless bearing. It is backed by an elongated gland nut 32 which surrounds the apron 31 and abuts against the lower side of gland ring 30, being threaded into the cylindrical bracket 10. At its lower end this nut is preferably provided with a series of indentations 33 for the reception of a wrench, and also for engagement with a locking finger 34 that is releasably attached to the bracket 10 by means of a set screw 35 that extends through a slot in the finger, as indicated in Fig. 2. Adjustment of the nut 32 of course regulates the degree of expansion of the packing 29, so that the joint may be made fluid-tight without undue friction upon the piston.

Into the lower or outer end of the cylinder 23 I fit a forging 36 comprising two depending ears 37 having openings 38 therethrough for the reception of fastenings, by means of which the strut is to be attached directly or indirectly to the remaining one of the two parts whose relative movements are to be cushioned, this being in most cases an axle of an automotive vehicle.

*Operation.*—The parts as illustrated in Fig. 2 are substantially in the position which they will occupy when the strut is attached to a motor vehicle at rest. At this time oil fills the space 28 and extends for a short distance above the head 24, 25 of the piston. Above the oil level, cylinder 15 and dome 16 are filled with air under pressure, which supports the weight of the vehicle. Now, when the vehicle wheel adjacent any particular shock absorber strikes a bump in the road, the shock is transmitted to the inner cylinder 23 in what is known as an impact stroke. This stroke tends to telescope the two members together. Its movement may be delayed to some extent by the metering of liquid through the groove 26 from the space above the piston to the annular space 28, to overcome the tendency toward vacuum set up in this annular space. As soon as the compression of the air above the piston equals the force of the impact, the upward piston travel stops and the great energy built up in the highly compressed air above the piston tends to drive the latter down suddenly and very vigorously on the rebound stroke. This movement is checked however by the column of liquid in the annular space 28, which has no exit, except through the groove 26. By regulation of this groove, as to size and length, or by varying the number of grooves where more than one are used, I am enabled to vary the time interval within which the rebound stroke is terminated.

At the same time, there is a centering and steadying effect upon the piston. This is due to the fact that the oil traversing the groove 26 is under heavy pressure, and some of it works out along the joint between the collar 25 and cylinder wall, assuring the separation of these two metal surfaces by an oil film. The greater the load imposed upon the strut, the greater will be the pressure of the oil in this groove, and hence the piston head is always accurately centered regardless of the pressure put upon it. Furthermore, this enables me to employ closer fits between the piston head and cylinder than could otherwise be employed, on account of the highly efficient lubrication of the piston head resulting from the pressure application of oil to the slide surfaces from the groove 26.

The head construction above described, together with the large bearing area provided for the lower portion of the piston wall by the elongated apron 31, serve to maintain the piston and cylinder accurately aligned at all times in spite of such sidewise pressures as may be imparted to the ears 37, and hence the working of the strut is smooth and sure.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a shock absorber of the fluid type, a cylinder, a piston movable therein, said piston having a piston head overhanging the side wall of the piston, and the open end of the cylinder being slidably fitted to the piston wall by a fluid-tight joint, whereby an annular space of varying size is provided between the cylinder and piston wall as the piston moves back and forth, said head having a spiral groove in its outer wall extending entirely around the periphery thereof and open top and bottom, whereby oil is adapted to flow into and out of said annular space from and to the interior of the cylinder beyond the piston.

2. In a hydro-pneumatic shock absorber, a pair of telescoping cylinders, the outer cylinder being closed at its outer end and the inner cylinder being closed at its inner end, a fluid-tight joint between the open end of the outer cylinder and the wall of the inner cylinder, the inner end of the inner cylinder being provided with an overhanging head having a sliding fit within the outer cylinder, said head having a spiral groove formed in its outer surface extending entirely around the periphery thereof and open at both ends, whereby oil is adapted to flow into and out of said annular space from and to the space between the closed ends of the cylinders.

3. In a shock absorber of the fluid type, a pair of telescoping cylinders, the inner cylinder being closed at its inner end and the outer cylinder at its outer end, said inner cylinder having an exterior diameter less than the interior diameter of the outer cylinder, and the open end of the outer cylinder being slidably fitted to the inner cylinder, and a ring threaded onto the inner end of the inner cylinder and fitted to slide within the wall of the outer cylinder, whereby an annular space is provided between the cylinders behind said ring, said ring having a spiral groove in its outer surface extending entirely around the periphery of the ring and open at both ends, whereby oil is adapted to flow into and out of said annular space from and to the space between the closed ends of the cylinders.

4. In a shock absorber, an outer cylinder and an inner cylinder spaced apart, a cylindrical bracket within which the outer cylinder is mounted, a packing also supported in said cylindrical bracket in position to engage the wall of the inner cylinder, a packing gland ring, and a bearing sleeve integral with said ring formed of low-friction metal adapted to engage said inner cylinder.

5. In a shock absorber, an outer cylinder and an inner cylinder spaced apart, a cylindrical bracket within which the outer cylinder is mounted, a packing also supported in said cylindrical bracket in position to engage the wall of the inner cylinder, a packing gland ring having an inner cylindrical apron with a low-friction surface for engagement with the inner cylinder, and an elongated gland nut surrounding said apron abutting said ring and threaded into engagement with said bracket.

6. In shock absorber, an outer cylinder, an inner cylinder spaced from the outer cylinder and having a head which slides in contact with the inner cylinder, a bracket within which the outer cylinder is mounted, and a fixed bearing sleeve rigidly supported with respect to said bracket and slidably contacting with the outer wall of the inner cylinder for centering and guiding the latter, said sleeve being formed of low friction metal.

JOHN F. WALLACE.